(12) United States Patent
Salvatore

(10) Patent No.: US 9,886,716 B2
(45) Date of Patent: Feb. 6, 2018

(54) METHOD, MEDIUM, AND SYSTEM FOR LOCATION BASED GIFT IDENTIFICATION

(71) Applicant: Rodd Salvatore, Stamford, CT (US)

(72) Inventor: Rodd Salvatore, Stamford, CT (US)

(73) Assignee: GiftTitan.com LLC, Stamford, CT (US)

( * ) Notice: Subject to any disclaimer, the term of this patent is extended or adjusted under 35 U.S.C. 154(b) by 0 days.

(21) Appl. No.: 15/088,564

(22) Filed: Apr. 1, 2016

(65) Prior Publication Data
US 2016/0335709 A1    Nov. 17, 2016

Related U.S. Application Data

(60) Provisional application No. 62/160,389, filed on May 12, 2015.

(51) Int. Cl.
*G06Q 30/06* (2012.01)
*H04W 4/02* (2009.01)

(52) U.S. Cl.
CPC ..... *G06Q 30/0639* (2013.01); *G06Q 30/0633* (2013.01); *H04W 4/02* (2013.01)

(58) Field of Classification Search
CPC .. G06Q 30/0639; G06Q 30/0633; H04W 4/02
USPC .............................................. 705/26.1, 27.2
See application file for complete search history.

(56) References Cited

U.S. PATENT DOCUMENTS

| | | | | |
|---|---|---|---|---|
| 7,071,842 B1 * | 7/2006 | Brady, Jr. | .............. | G01C 21/20 |
| | | | | 340/988 |
| 8,427,303 B1 * | 4/2013 | Brady, Jr. | .............. | G06Q 10/10 |
| | | | | 340/539.1 |
| 2001/0054009 A1 * | 12/2001 | Miller | ................ | G06Q 30/0225 |
| | | | | 705/26.1 |
| 2007/0073580 A1 * | 3/2007 | Perry | .................... | G06Q 30/02 |
| | | | | 705/14.53 |
| 2008/0249898 A1 * | 10/2008 | Ratnakar | .............. | G01S 5/0018 |
| | | | | 705/27.1 |
| 2010/0023341 A1 * | 1/2010 | Ledbetter | .............. | G06Q 10/06 |
| | | | | 705/1.1 |
| 2010/0222033 A1 * | 9/2010 | Scott | .................. | H04M 3/5322 |
| | | | | 455/414.1 |

(Continued)

OTHER PUBLICATIONS

Schafer, J. Ben, Joseph A. Konstan, and John Riedl. "E-commerce recommendation applications." Applications of data mining to electronic commerce. Springer US, 2001. 115-153. (Year: 2001).*

*Primary Examiner* — Matthew E Zimmerman
(74) *Attorney, Agent, or Firm* — Forge IP, PLLC

(57) ABSTRACT

A system using a mobile device and computing device connected to a network, a member database containing information on the members of the system and the gift items each has identified in one or more gift lists, and a merchant database containing information on merchant geolocations and inventories. The mobile device uses geolocation identification software utilizing GPS technology to pinpoint the mobile device's geolocation. The computing device compares the mobile device's geolocation to the merchant geolocations and compares the merchant inventories with the gift items. If a merchant located within a threshold proximity of the mobile device has a gift item in its inventory, the computing device sends an alert over the network to the mobile device indicating the geolocation of the merchant and gift item offered for sale.

30 Claims, 10 Drawing Sheets

(56) References Cited

U.S. PATENT DOCUMENTS

| | | | |
|---|---|---|---|
| 2010/0262464 A1* | 10/2010 | Monteforte | G06Q 10/00 |
| | | | 705/7.29 |
| 2011/0238755 A1* | 9/2011 | Khan | G06O 50/01 |
| | | | 709/204 |
| 2011/0313874 A1* | 12/2011 | Hardie | H04W 4/02 |
| | | | 705/26.1 |
| 2012/0179547 A1* | 7/2012 | Besore | G06Q 30/0261 |
| | | | 705/14.58 |
| 2013/0143586 A1* | 6/2013 | Williams | G06Q 30/0261 |
| | | | 455/456.1 |
| 2013/0166386 A1* | 6/2013 | Simmons | G06Q 30/0261 |
| | | | 705/14.58 |
| 2013/0268391 A1* | 10/2013 | Esch | G06Q 30/02 |
| | | | 705/26.7 |
| 2013/0275250 A1* | 10/2013 | Rodell | G06Q 30/0601 |
| | | | 705/26.1 |
| 2013/0297493 A1* | 11/2013 | Linden | G06O 20/28 |
| | | | 705/39 |
| 2013/0304559 A1* | 11/2013 | Stone | G06Q 20/06 |
| | | | 705/14.33 |
| 2014/0006163 A1* | 1/2014 | Sengupta | G06Q 30/02 |
| | | | 705/14.58 |
| 2014/0280527 A1* | 9/2014 | Chatterjee | H04L 67/22 |
| | | | 709/204 |
| 2015/0039464 A1* | 2/2015 | Seetharam | G06Q 30/0633 |
| | | | 705/26.8 |
| 2016/0012491 A1* | 1/2016 | Shah | G06Q 30/0269 |
| | | | 705/14.58 |
| 2016/0086249 A1* | 3/2016 | Zamer | G06O 30/0631 |
| | | | 705/26.7 |

* cited by examiner

METHOD, MEDIUM, AND SYSTEM FOR LOCATION BASED GIFT IDENTIFICATION

FIELD OF THE INVENTION

The present technology relates to a system and software application for locating gift items and providing notifications based at least in part on a person's location. The technology provides a system that identifies the location of the user using GPS technology and alerts the user of nearby merchants selling items on other users' gift lists.

BACKGROUND OF THE INVENTION

Consumers in the marketplace are often searching for gifts for others, particularly around holidays or in anticipation of a person's birthday. Finding and buying the right gift for a particular recipient can be troublesome, especially around certain holidays, such as Christmas, Chanukah, etc., when many people are shopping for many recipients.

In an attempt to make the gift shopping experience more pleasant, several websites have implemented various strategies to assist the shopper. For example, amazon.com uses "shopping lists" and "wish lists" to organize gift ideas. The lists can be shared with others or searched by others to assist gift-givers in finding good gift ideas around birthdays, holidays, etc. Other websites employ similar wish list or gift list approaches, such as thethingsiwant.com, wishlistr.com, whimventory, wishlisttracker, etc. Some websites also offer a mobile application to accomplish the same objectives.

Other websites provide a gift registry whereby a person can identify a range of items they would like as gifts and those planning to give a gift can view the requested items. Such registries are often used by those planning a wedding or throwing a baby shower. These websites often have the added benefit of permitting the gift-buyer to anonymously mark a particular item as purchased to ensure the recipient does not receive duplicate gifts. Many stores such as Target, Bed, Bath, & Beyond, etc. offer gift registry systems and services. Other websites provide gift registries independently as well, such as familygiftregistry.net.

While these approaches have been relatively effective in assisting gift-givers in coming up with good gift ideas, the approaches taken by these websites do not assist the users in actually finding the gifts, for example when the user is out shopping. Thus, there remains a need in the art for a system that assists its users in actually locating gift items they are searching for.

The use of geo-location technology could improve customers' access to information about nearby locations selling items they are seeking. In addition, notification alerts could benefit both merchants and consumers in reminding the users of upcoming gift-giving events, such as holidays and birthdays. For example, a user might be in a mall for one reason or another and could be alerted that a store in the mall sells an item on a friend's gift list, and that the friend has an upcoming birthday. Such a notification would benefit the user by reminding him or her of the upcoming event and the location of an appropriate gift. It would also benefit the merchants selling the items, as the user might be inspired to make a purchase he or should would not have otherwise. Furthermore, a notification providing information about the same or similar items from other merchants could help shoppers to make more informed buying decisions.

These benefits would improve the gift shopping experience by organizing and locating gifts the user intends on buying with the added benefit of reminding the user of the upcoming gift-giving event.

SUMMARY OF THE INVENTION

The present technology accordingly provides a system that notifies users of the proximity of merchants selling items on friends' and loved ones' wish lists. The technology utilizes geolocation identification of the user and employs databases of other users' gift ideas, merchant locations, and merchant inventories to inform users of when they are close to a merchant selling an item on a person's list. The merchant inventories may be based on the merchant's online offerings or based on the specific merchant location's inventory items, in some embodiments. The geolocation of the user may be identified using GPS technology, indoor positioning systems such as Apple's iBeacon, Google's Eddystone, or the like, or other emerging geolocation systems. The technology further notifies its users about upcoming gift-giving events, such as birthdays, and may provide price and availability information about similar substitute items or the same items from one or more other merchants.

The claimed system can be manipulated to fit the user's individual needs by specifying particular criteria for sending an alert. For example, a user might specify the other users the person wants to buy gifts for, how close to the merchant the user must be, how close a gift giving event must be, and even the price of the gift item. Such filters and the like help the user shape the system to provide only the desired notifications.

To accomplish its objectives, the claimed technology employs a system using a mobile device and computing device connected to a network, a member database containing information on the members of the system and one or more gift lists containing gift items associated with the members, and a merchant database containing information on merchant locations and inventories, populated using either online inventory information or specific merchant location inventory information. The mobile device uses geolocation identification software to pinpoint the mobile device's current location. The mobile device sends its location information over the network to the computing device. The computing device then compares the mobile device's location to the merchant locations stored in the merchant database. The computing device also compares the merchant inventories stored in the merchant database with the gift items stored in the member database to identify any matches. If a merchant located within a threshold proximity of the mobile device has a gift item in its inventory, the computing device sends an alert over the network to the mobile device indicating the location of the merchant and gift item(s) offered for sale.

The system further has many user defined parameters that may be utilized to limit the number and nature of alerts the mobile device receives. For example, the user can specify the threshold proximity to a merchant location that the mobile device must be within to trigger an alert. In some embodiments, an alert may only be sent once the mobile device enters the boundaries of the merchant selling the gift item. In some embodiments, the alerts might also indicate price information about the same or similar gift items sold by other merchants for comparison. The user may also specify a time period within which a gift giving event, such as a birthday or holiday, must occur to trigger an alert for a particular member's gift items.

A user can also limit the alerts sent to the mobile device by following certain members they are interested in purchasing gifts for. The alerts could be further limited by identifying preferred members among those followed and permitting alerts only for gift items associated with preferred members. Similarly, the user might place members into one or more groups, such as friends, family, loved ones, etc., and trigger alerts only for gift items associated with members in one or more groups. Or a user might choose to follow a particular gift list rather than the member, limiting alerts to only those items on the followed lists.

Further limitations on the parameters for triggering an alert might include identifying chosen merchants and/or identifying particular categories of gifts. An alert might be triggered only if the gift is sold by a chosen merchant within the threshold proximity or if the gift falls within an identified category of gifts. A user might also specify a budget he or she is willing to spend on one or more members. If a gift item on one of those members' lists costs more than the specified budget threshold, the system would not send an alert. Such a parameter could be facilitated by adding price information to the inventories stored on the merchant database.

A user might use any number of these additional parameters to limit the number of alerts he or she receives or, indeed, might use none of them. Those skilled in the art would no doubt recognize a variety of additional parameters that might be used to limit the number of alerts sent to the user's mobile device as well as other arrangements and applications of the system. This specification is not intended to be limiting and incorporates those additional features, arrangements, and applications within the ordinary knowledge and creativity of those skilled in the art.

The claimed technology also employs a method for notifying a user of the user's proximity to a merchant selling a particular gift item. The method identifies the geolocation of a mobile device, identifies one or more gift lists associated with one or more members, identifies the inventories and geolocations of one or more merchants, compares the gifts lists to the merchant inventories and compares the mobile device's geolocation to the merchants' geolocations, and alerts the mobile device if a merchant selling an item on a gift lists is within a threshold proximity of the mobile device's location. Again, merchant inventories may reflect either online inventory information for a merchant in general or specific merchant location inventory information.

Like the claimed system, the method can also include additional steps to limit the number of alerts received. For example, additional steps might include specifying a time period within which a gift-giving event must occur, choosing particular members for whom the user wishes to give gifts, choosing particular lists on which a gift item must appear, specifying a budget below which the gift item must be priced, choosing a category the gift item must fall within, choosing particular merchants selling the gift items, etc. Further additional steps and variations to the method are also possible and will be understood by those of ordinary skill in the art.

In some embodiments of the present technology, the alert notification sent to the mobile device contains specific information about the gift item and other, competing items sold by other merchants. For example, the alert notification might contain, in certain embodiments, a description of the gift item and the price listed by the present merchant. The alert notification might also contain price information about the same item sold by another merchant, for example an online retailer. Further, the alert notification might contain description and price information about other, similar items sold by other merchants. In such embodiments, the user can compare the prices of the gift item and/or other, similar items sold across various merchants to make an informed purchasing decision. In some embodiments, the system may also facilitate the user's purchase of the gift item from a competing merchant, for example through an online retail sale over the network. The same parameters outlined above may be used to limit alert notifications sent in this embodiment of the present technology as well.

Those skilled in the art will appreciate the many alterations possible to the presently described technology. The present technology is not limited to the embodiments and arrangements described above. Other objects of the present technology and its particular features and advantages will become more apparent from consideration of the following drawings and detailed description of the technology.

DETAILED DESCRIPTION OF THE INVENTION

Figure 1:
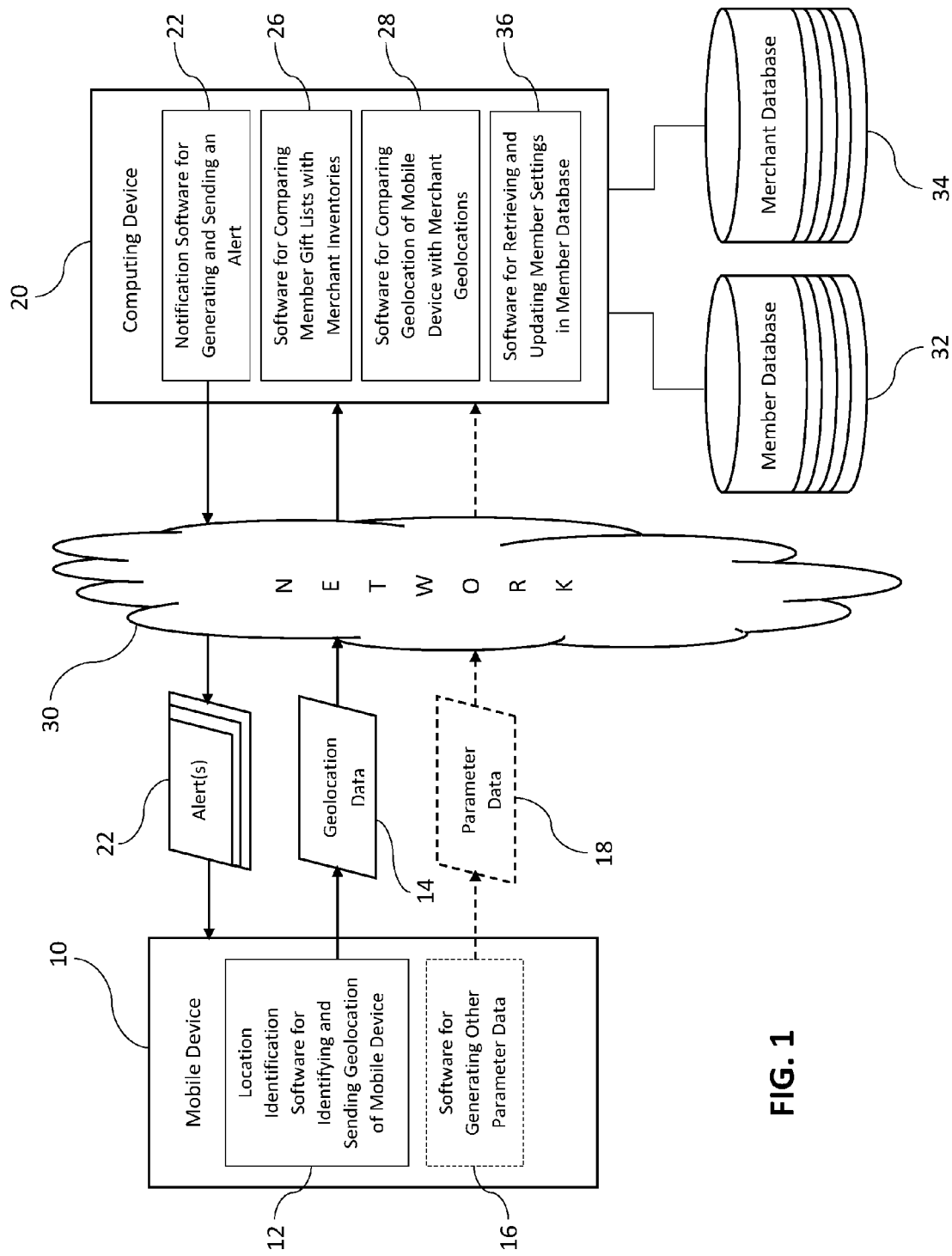
FIG. 1 is a schematic representation of a system according to exemplary embodiments of the present technology.

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

The present technology offers a comprehensive solution for the gift buying and receiving experience. In addition to gift lists, users of the technology will have the ability to identify particular profile traits, including clothing sizes and favorite items on their gift lists, to indicate the best gift options rather than simply choosing a random gift item from a list. The technology is intended to provide a one stop, user friendly, entertaining platform to help users find the best, most meaningful gifts to buy for their loved ones in an efficient and effective manner. The technology is designed to provide users with all the necessary information about other members to ensure the gifts they receive are desired, the correct size, etc. Member profiles are designed to reveal the essence of the other members so the user can find creative and meaningful ways to deliver great gifts, not just choosing a gift item off a gift list randomly.

The technology employs a system that stores a basic profile of a member, including lists of gift items, favorites, clothing sizes, etc. Member profiles may include more than one gift list, for example a wish list (for items that the member really wants) and a fun list (for items of interest to the member) in some embodiments. Numerous other arrangements and features for the gift lists will be well within the knowledge and creativity of those skilled in the art.

Gift items on members' gift lists may be imported using a custom API or may be manually entered by users of the system to include pertinent information. In some embodiments, gift lists may be populated based on data about the user, such as the user's online browsing activity, shopping activity, etc. Information about the gift items, including category, store, brand, etc. may be automatically populated by the API. Gift lists may be organized based on criteria such as price, store location, occasion, category, priority, time, etc. In some embodiments, gift items may also be distinguished as "reserved" or "available" for the benefit of secondary users while remaining indistinguishable to the primary user to retain the element of surprise in receiving gifts.

The claimed technology includes a notification and alert system that can track the user's geolocation on a mobile device, such as a smart phone, tablet, laptop computer, etc. The system can compare the mobile device's geolocation with the stored geolocations of merchants selling gift items on other members gift lists and send an alert notification to the mobile device when the user is within a threshold proximity of one or more such merchants. In some embodiments, the user can set the threshold distance. In some embodiments, an alert may be sent when the user enters a store selling one or more gift items and may list those gift items offered for sale in the store.

The geolocation of the user may be identified using well known GPS technology or other geolocation technologies. For example, some applications employ a technology that can identify the location of a mobile device by electronically communicating with other mobile devices nearby. Some of the largest technology companies in the world have employed this type of internal positioning system technology: Apple calls its iBeacon; Google calls its Eddystone; etc.

Such emerging technologies are most beneficial to identify a mobile device's geolocation indoors, where obstructions can cause GPS technology to act unreliably. Those of ordinary skill in the art will recognize the various geolocation systems available, and the present technology is not limited to the use of any particular geolocation technology.

In still further embodiments, an alert notification may provide information, such as price and availability, about similar substitute gift items from other merchants. Or the alert notification might indicate other merchants selling the same gift item at a different price. Such alert notifications will assist the user in performing price comparisons and making informed decisions at the time of purchase. For example, an alert notification might indicate that amazon sells the same item as the merchant the user is shopping at for a lower price, allowing the user to decide whether the amount of savings would justify waiting for the item to be shipped.

In some embodiments, the present technology may include a map display identifying merchants within a threshold proximity selling items on other members' gift lists. In some embodiments, the user could use the map with the geolocations of applicable merchants to create a shopping route for purchasing multiple gifts from several stores. Such application would be particularly useful around certain holidays, such as Christmas and Chanukah, when gift shopping can be especially troublesome and complicated.

Further embodiments of the present technology may also include a calendar of events indicating upcoming gift-giving events, such as birthdays, holidays, anniversaries, etc. The claimed system might send an alert to the user when a gift-giving event is within a threshold time period. Other embodiments might limit alerts to be sent only if both the threshold proximity and the threshold time period requirements are met.

Still other embodiments of the present technology can associate a particular budget with another member the user intends on buying gifts for and track purchases and expenditures under that budget. In some embodiments, the claimed system might trigger an alert only if the gift item sold by a merchant within the threshold proximity of the mobile device is priced within the defined budget. Other arrangements and embodiments will be apparent to those of ordinary skill in the art.

In some embodiments, a user may choose to share his or her gift lists only with select members of the system. In other embodiments, the user may choose to follow other members, may identify other members as preferred members, or may place certain other members into user defined groups, such as friends, family, coworkers, loved-ones, etc. In certain embodiments, the claimed system might send alert notifications only for items on the lists of followed members, preferred members, and/or members of one or more groups.

Other embodiments of the present technology might include an incentive based platform whereby children, for example, could earn points toward gift items on their lists through good behavior, achievements in school, performance of chores, etc. In some embodiments, the platform might also allow the child to allocate points earned toward particular gift items, which might then be purchased by their parents or other family members. In some embodiments, the platform might display a graph reflecting the points earned and those required for a particular gift, etc. Those of ordinary skill in the art will recognize alternative embodiments and arrangements of the incentive based platform.

Still further embodiments of the present technology can include a chip-in-section that allows members to pledge to buy a percentage of a gift item on another member's gift lists. For example, a highly priced item might have multiple members pledge to pay for a portion, and once the full price has been pledged, the claimed system might send an alert to those members who pledged a portion that the full price has been reached and, in some embodiments, may identify those other members. Additional aspects of the present technology might also include identification of gift items members are willing to donate to charity or other organizations.

Populating a member's gift lists might be accomplished, in some embodiments, via a toolbar tag through an internet browser service. Such a tag might include a detailed template about the gift item, such as stores selling the items, profile details about the member (e.g. size preferences, color preferences, etc.), gift-giving occasion (e.g. wanted for birthday, holiday, etc.), sharing status (e.g. share item or list with public, followers only, members of a group only, select members only, etc.), and level of priority (e.g. 1-10, high-med-low, 1-5 stars, etc.).

The present technology may also, in some embodiments, employ a news feed of recent postings on other members' gift lists. Like the alert notifications, the news feed might be limited to specific members, specific items, specific categories, specific lists, items associated with a member with an upcoming gift-giving event, etc. The news feed could also be organized or filtered by these same attributes. The feed might, for example, stream across the bottom of the system's display, or the user might select a different application. Those skilled in the art will recognize alternative embodiments and arrangements of the present technology.

In some embodiments, the present technology may also provide information about the same or similar gift items sold by other merchants for comparison. A comparison display might be used, in some embodiments, showing the gift item and price offered by the instant merchant as well as other merchants selling the same or similar gifts at the same or different prices. Such merchant inventory and prices may be populated using information from each merchant's online retail store or information from each merchant location's inventory, for example. Other arrangements and variations will be ascertainable to those of ordinary skill in the art.

In some embodiments, the price comparison information may be displayed in an alert notification. For example, a user entering the proximity threshold of a merchant selling a gift item might receive an alert indicating the merchant, gift item and price, and alternative merchants selling the same gift item or similar gift items at the same or different prices. Such information might inspire the user to enter the merchant and purchase the gift item at that time to get a great deal or might inspire the user to order the gift item from another merchant at a lower price. The information provided will assist the user in deciding if the price justifies purchasing the gift item immediately or not. In some embodiments, an alert notification reflecting the price comparison information may be sent only upon the user's entry into the boundaries of the merchant's physical location. Other arrangements, embodiments, and variations on the present technology's principles will be understood and within the ordinary skill in the art.

Referring now to the Figures, and first to FIG. 1, depicted is a schematic representation of certain embodiments of the claimed technology. The depicted system employs a mobile device 10 and a computing device 20 connected to a network 30. In some embodiments, the network 30 may be the internet. The mobile device 10 contains location identification software 12 for identifying and sending the mobile device's geolocation data 14 using GPS technology or other geolocation technology such as iBeacon, Eddystone, etc. In some embodiments, the mobile device 10 may also include software 16 for generating and sending other parameter data 18. The mobile device can send the geolocation data 14 and other parameter data 18 over the network 30 to the computing device 20.

The computing device 20 contains notification software 22 for generating and sending one or more alerts 24 as well as software for comparing member gift lists with merchant inventories 26 and software for comparing the geolocation of the mobile device with merchant geolocations 28. In some embodiments, the computing device further contains software for retrieving and updating member settings from the member database 36. If the computing device 20 receives parameter data 18 from the mobile device 10, the software 36 updates the member's profile in the member database to reflect those parameters 18. A member database 32 stores information about the members of the system, including gift items on one or more gift lists associated with each member and other profile information, such as gift preferences, clothing sizes, etc. In some embodiments, the member database may also store information about the member's A merchant database 34 stores information about merchants, including the merchant's location, inventory, and prices, in some embodiments.

The computing device 20 compares the gift items stored in the member database 32 with the merchant inventory stored in the merchant database 34 to identify merchants selling items on the members' gift lists. The computing device 20 also compares the geolocation of the mobile device 10 with the merchant geolocations stored in the merchant database 34 to identify those merchants located within a threshold proximity of the mobile device 10. The computing device 20 generates one or more alerts 24 if a merchant selling a gift item on a member's gift lists is within the threshold proximity of the mobile device 10. In some embodiments, the computing device 20 only generates an alert if other parameters are met. Additional parameters 18 may be user defined, as depicted, and stored in the member database 32. The computing device 20 may retrieve the alert notification parameters from the member database 32 and generate an alert only if the additional filters have been met. The computing device 20 then sends the one or more alerts 24 over the network 30 to the mobile device 10 relaying the merchant and gift item information.

While the embodiment depicted in FIG. 1 employs an arrangement wherein the mobile device 10 and computing device 20 are separated by the network 30, other available arrangements will be understood by those of ordinary skill in the art. For example, in some arrangements the system could be employed entirely on the user's mobile device 10. The database information and software for generating alerts might all be stored locally in such an arrangement. In some arrangements, the databases 32, 34 might be separated from the computing device 20 over the network 30 and/or additional databases might be utilized. The present technology is not limited to the particular arrangements and features described and depicted in FIG. 1, and these and other arrangements will be apparent to one of ordinary skill in the art.

Figure 2:
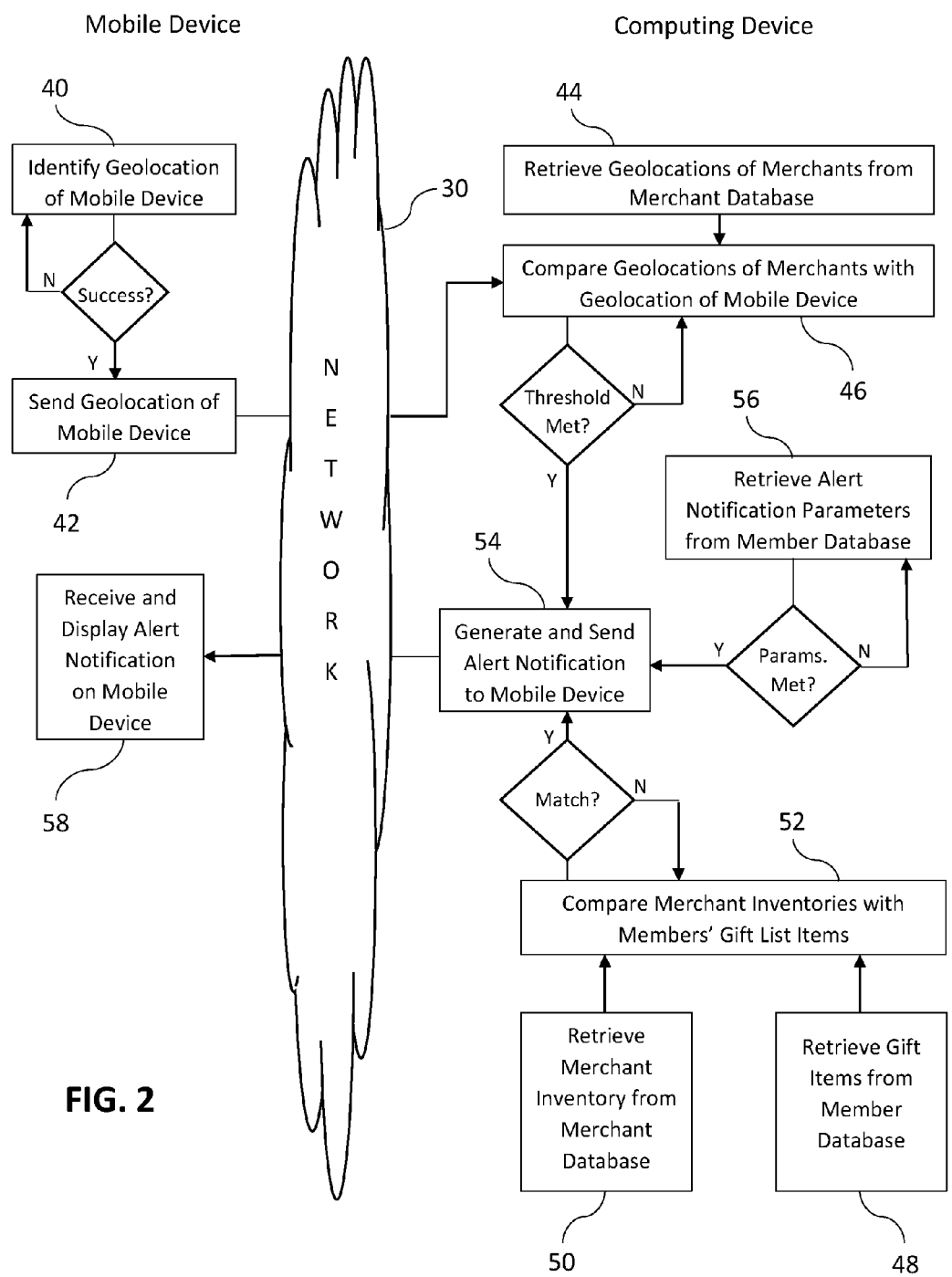
FIG. 2 is a schematic representation of a method that might be employed by the system of FIG. 1 according to exemplary embodiments of the present technology.

Referring next to FIG. 2, depicted is a schematic representation of certain embodiments of the claimed technology. The depicted method utilizes a mobile device 10 and a computing device 20 connected to a network 30. The first step of the method involves identifying the geolocation of the mobile device 40. If the mobile device's geolocation is successfully identified (geolocation identification might be unsuccessful, for example, if the mobile device does not have reception, reception is blocked, the device is in airplane mode, etc.), the mobile device sends its geolocation information 42 across the network to the computing device. The computing device then retrieves the geolocations of the merchants stored in a merchant database 44 and compares the mobile device's geolocation with the merchants' geolocations 46 to determine if the mobile device is within a threshold proximity of any of the merchants' geolocations. The computing device also retrieves the identity of gift items stored in the member database 48, retrieves the merchant inventories stored in the merchant database 50, and compares the merchant inventories with the gift list items to determine if there are any matches 52. If a merchant located within the threshold proximity of the mobile device is selling a gift item on another members' one or more gift lists, the computing device generates and sends an alert notification 54 across the network to the mobile device. In some embodiments, the computing device also retrieves alert notification parameters from the member database 56 and generates an alert only if the parameters are met. The mobile device displays the alert notification to the user upon receipt 58.

While the embodiment depicted in FIG. 2 employs an arrangement wherein the mobile device 10 and computing device 20 are separated by the network 30, other available arrangements will be understood by those of ordinary skill in the art. For example, in some arrangements the method could be employed entirely on the user's mobile device 10. In such an embodiment, the database information would have to be stored locally on the user's mobile device. In some arrangements, the databases storing the pertinent information might also be separated from the computing device 20 over the network 30 and/or additional databases might be utilized. The present technology is not limited to the particular arrangements and features described and depicted in FIG. 2, and these and other arrangement will be apparent to one of ordinary skill in the art.

In some embodiments of the present technology, the notification alerts may contain only general information, for example that a merchant selling a gift item on a member's list is within the threshold proximity. Other embodiments may contain more detailed information, such as the identity of the merchant, its distance from the mobile device's current geolocation, and the identity of the gift item. Further embodiments might contain even more detailed information, such as the price of the gift item and the identity of the member, members, and/or gift lists with which the gift item is associated. Additional or alternative information may also be included in an alert notification in other embodiments. Those of ordinary skill in the art will recognize other possible elements that might be reflected in an alert notification. Such alternatives are incorporated into the present technology and would be well within the ordinary skill and creativity in the art.

Figure 3:
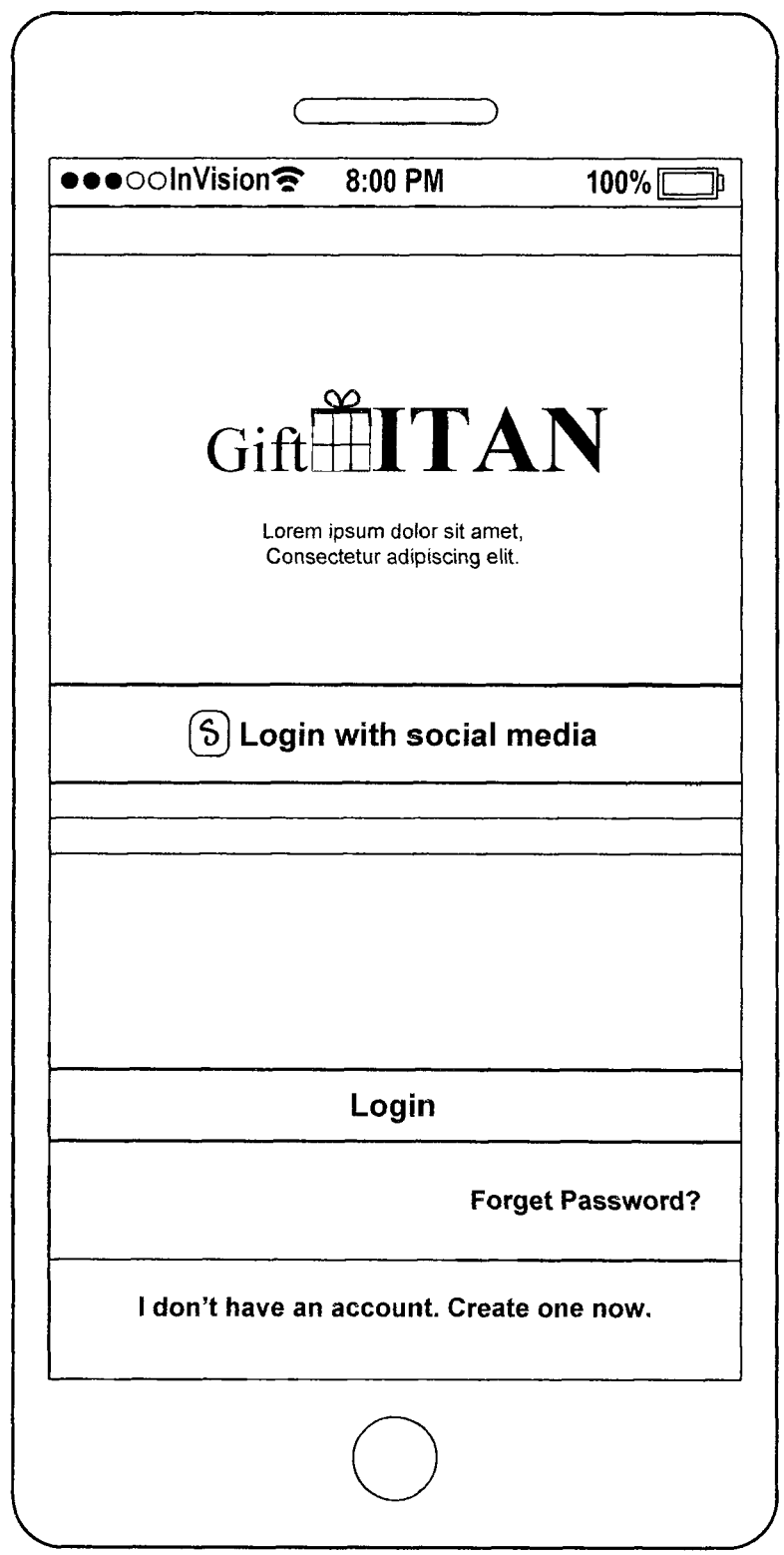
FIG. 3 is a depiction of a mobile application according to aspects of the exemplary embodiment of the present technology's system and method depicted in FIGS. 1 and 2 displaying a login module.
Figure 4:
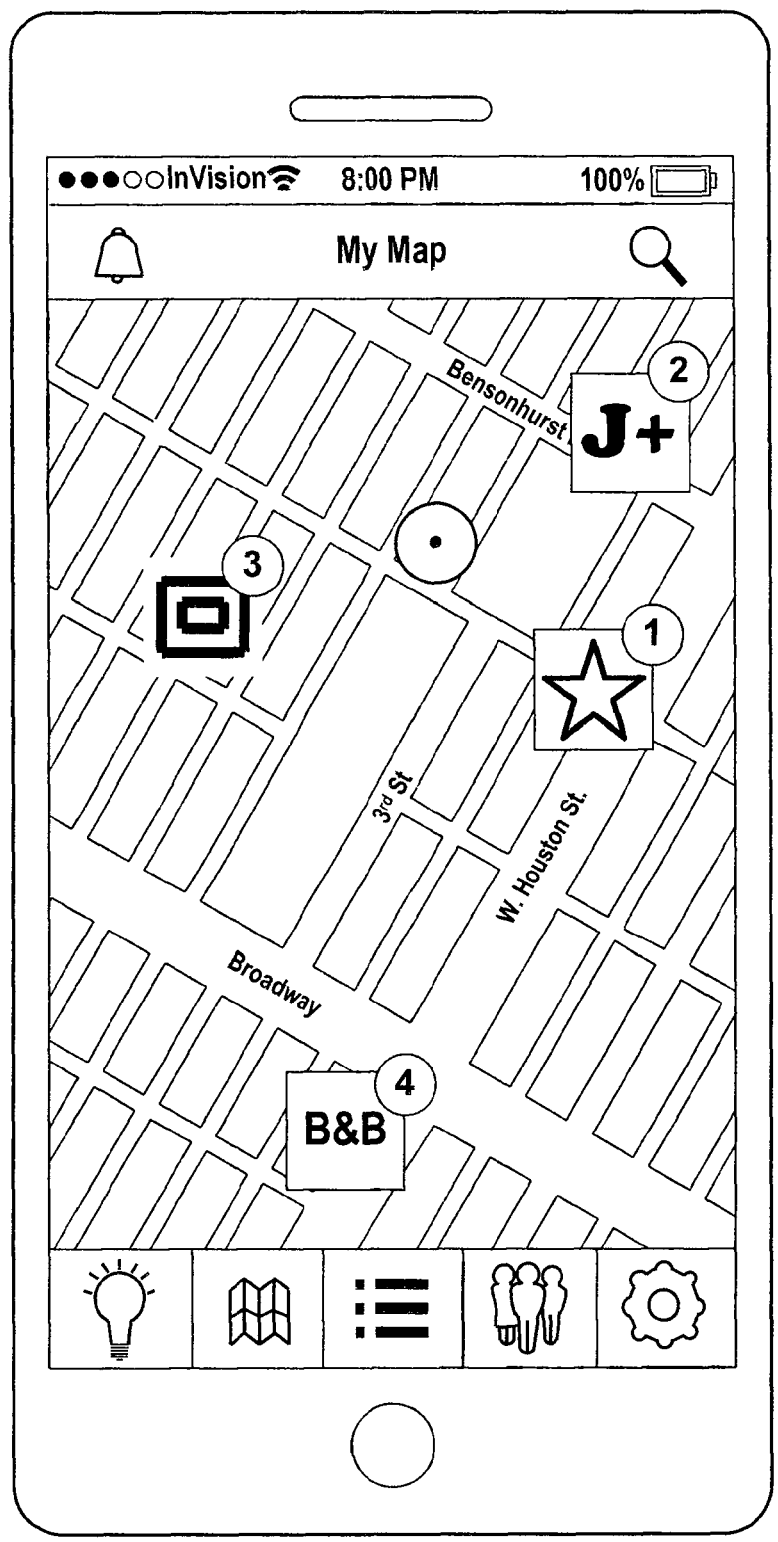
FIG. 4 is a depiction of a mobile application according to aspects of the exemplary embodiment of the present technology's system and method depicted in FIGS. 1 and 2 displaying a map identifying the mobile device's geolocation and several merchants' geolocations.

The remaining Figures depict a mobile application embodying the present technology represented by the schematic representations of FIGS. 1-2. FIG. 3 depicts a login screen for a mobile application embodying the present technology. Members employ a login username/email and password, which are stored in the member database in association with the members' profiles. FIG. 4 depicts a map displaying the geolocation of the mobile device and three particular merchants within a radial threshold proximity of the mobile device, according to certain embodiments of the present technology. In some embodiments, the user can specify the proximity threshold he or she prefers.

Figure 5:
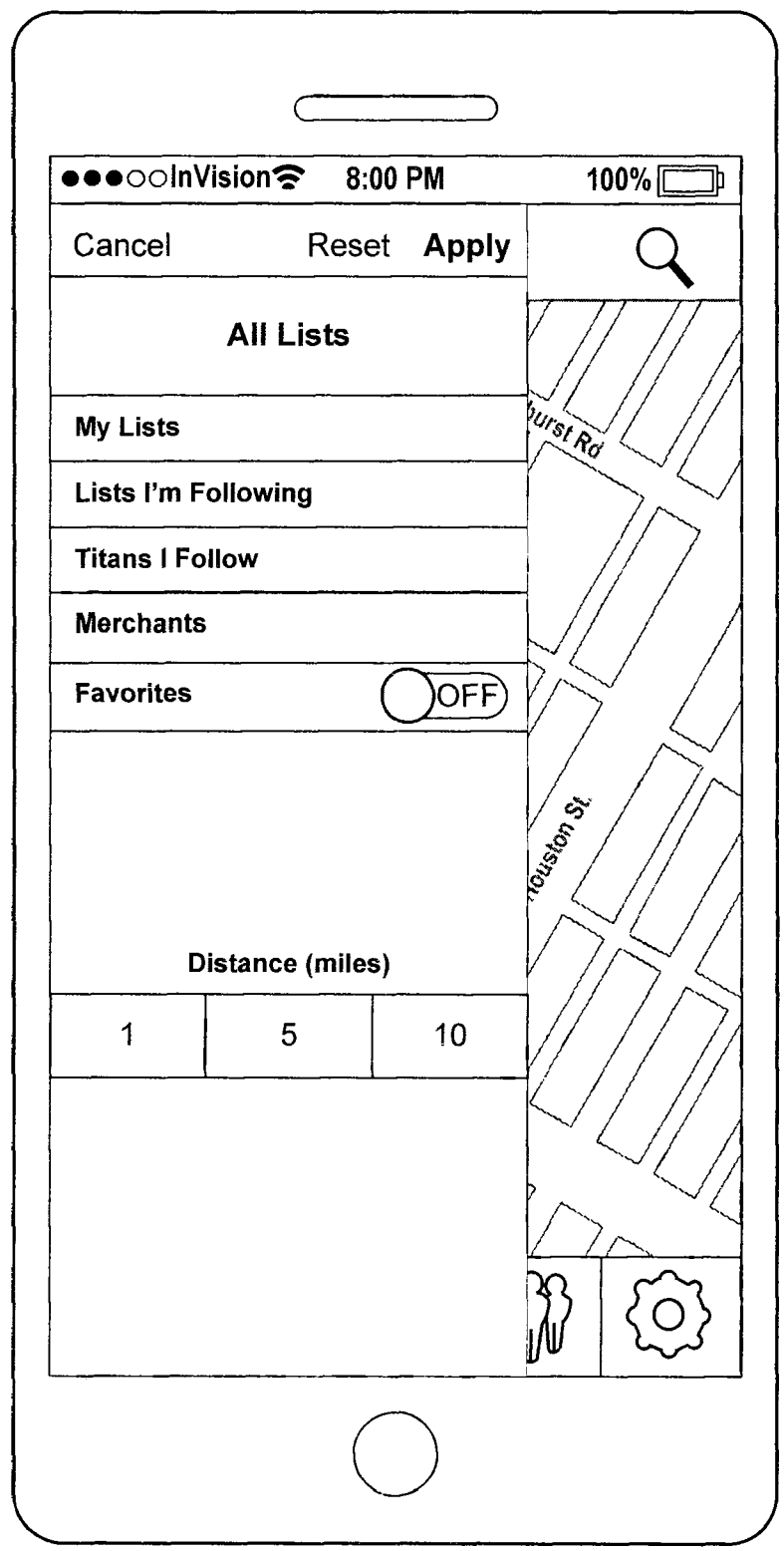
FIG. 5 is a depiction of a mobile application according to aspects of the exemplary embodiment of the present technology's system and method depicted in FIGS. 1 and 2 displaying an aspect of the user profile.
Figure 6:
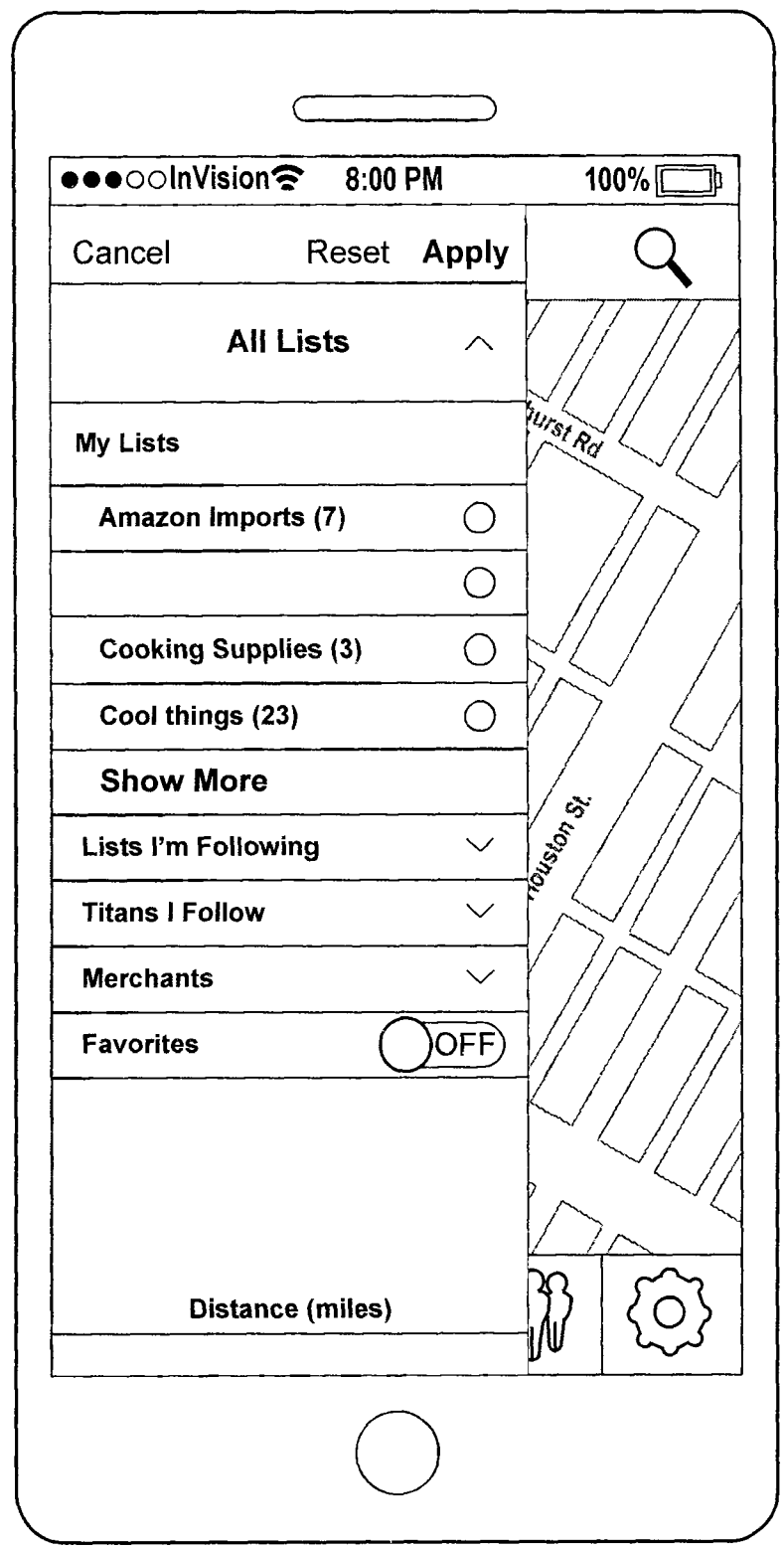
FIG. 6 is a depiction of a mobile application according to aspects of the exemplary embodiment of the present technology's system and method depicted in FIGS. 1 and 2 displaying an aspect of the user profile with the "My Lists" option expanded.

FIG. 5 depicts an aspect of the user's profile. As depicted, the user can create his own gift lists, follow the gift lists of other members, follow other members (aka Titans), identify particular merchants, and identify favorite gift lists, members, and/or merchants. FIG. 6 depicts the same aspect of the user profile depicted in FIG. 5 with the "My Lists" option expanded to display the various lists the user has generated. As depicted, a user may generate many more than a single list if he or she chooses.

Figure 7:
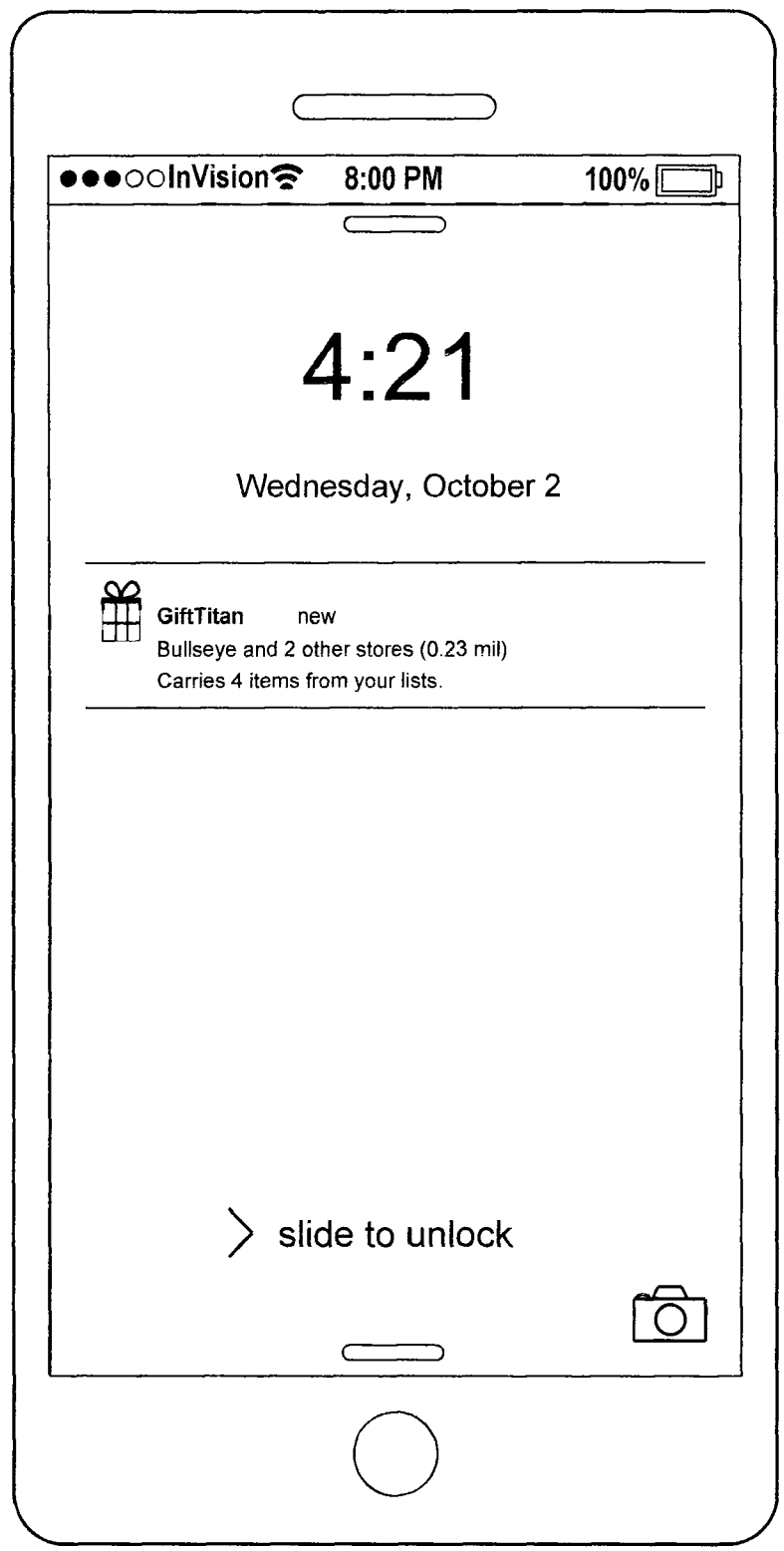
FIG. 7 is a depiction of an alert notification created by a mobile application according to aspects of the exemplary embodiment of the present technology's claimed system and method depicted in FIGS. 1 and 2.
Figure 8:
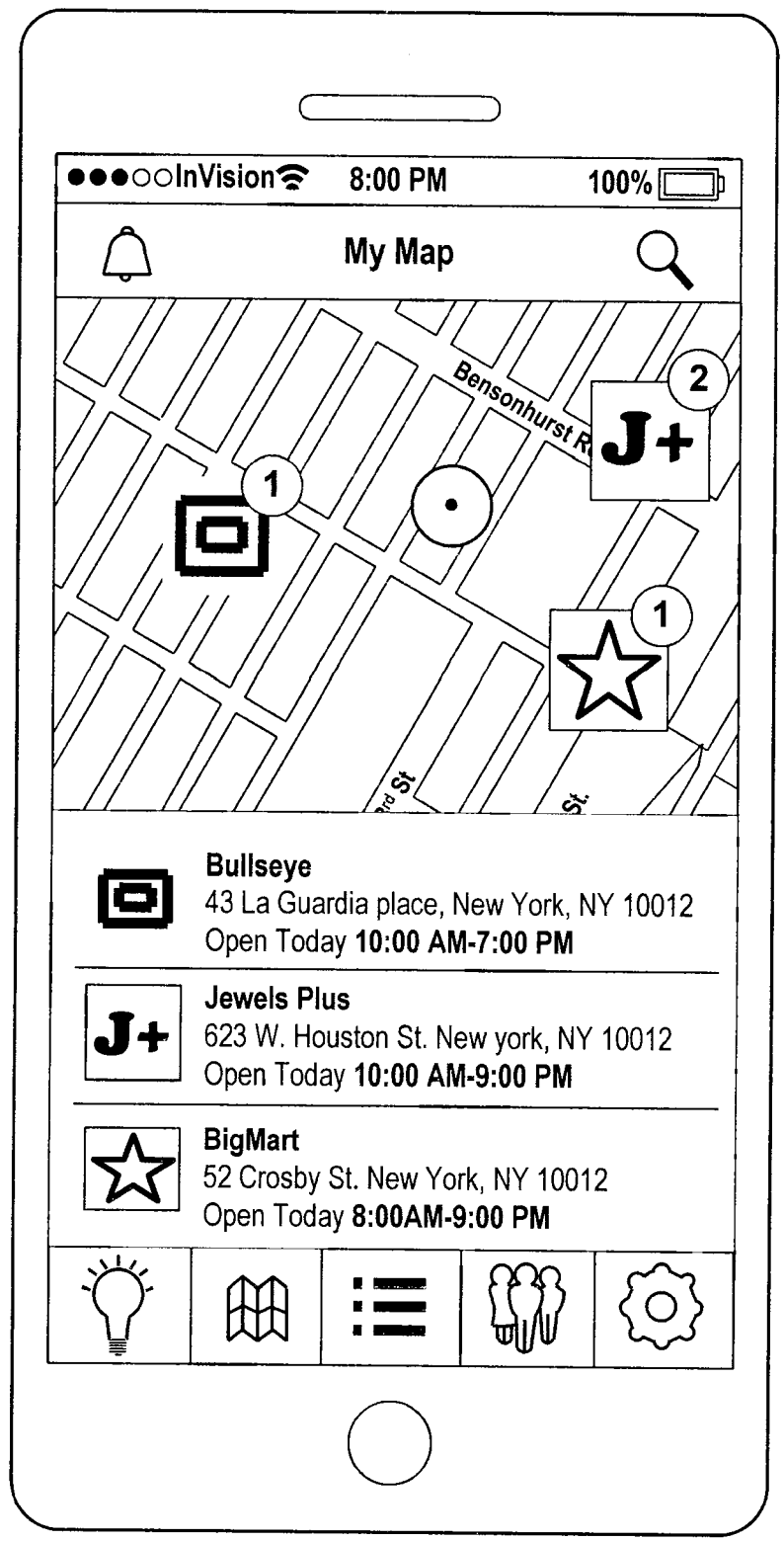
FIG. 8 is a depiction of a mobile application according to aspects of the exemplary embodiment of the present technology's system and method depicted in FIGS. 1 and 2 displaying a map identifying the mobile device's geolocation and several merchants' geolocations, the merchants selling gift items as notified in the depiction of FIG. 7.

FIG. 7 depicts an alert notification displayed on a locked phone (other mobile devices, such as a tablet, laptop, etc., can also be used). The notification indicates that three merchants are located within the threshold proximity of the mobile device's geolocation. The notification also indicates that those three merchants are selling four items from the user's lists. FIG. 8 depicts the mobile applications map feature displaying the mobile device's geolocation, the geolocations of the three merchants notified in FIG. 7, and the number of gift items offered for sale by each merchant.

Figure 9:
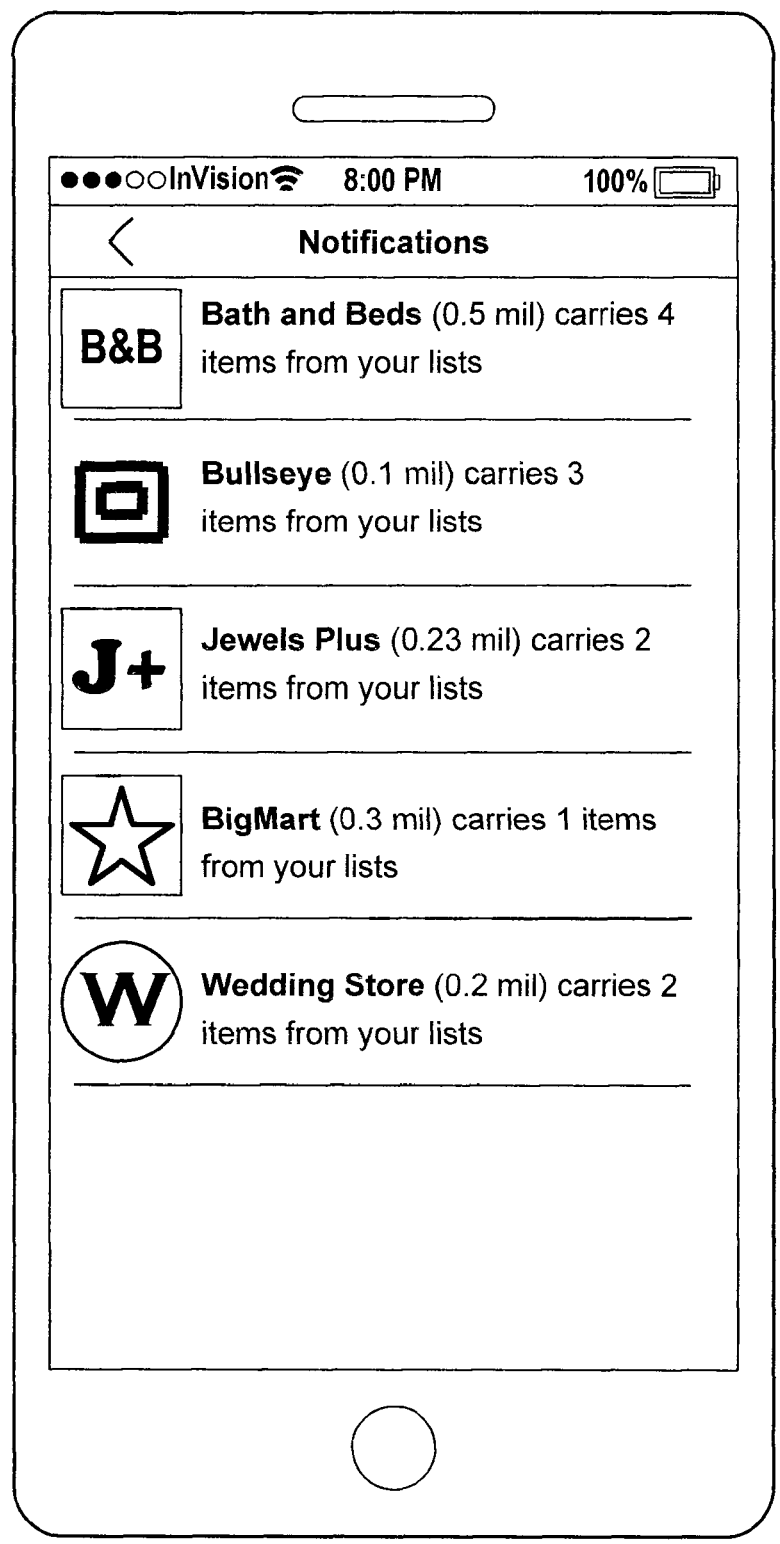
FIG. 9 is a depiction of a mobile application according to aspects of the exemplary embodiment of the present technology's system and method depicted in FIGS. 1 and 2 displaying a list of alert notifications.

FIG. 9 depicts a list of alert notifications according to aspects of the mobile application. Each notification provides information about the merchant, the merchant's proximity to the mobile device, and the number of gift items sold by the merchant. In some embodiments, activating one of the notifications (through touchscreen, mouse click, or other pointing device) displays further information about the merchant, the gift items for sale, and even the price.

Figure 10:
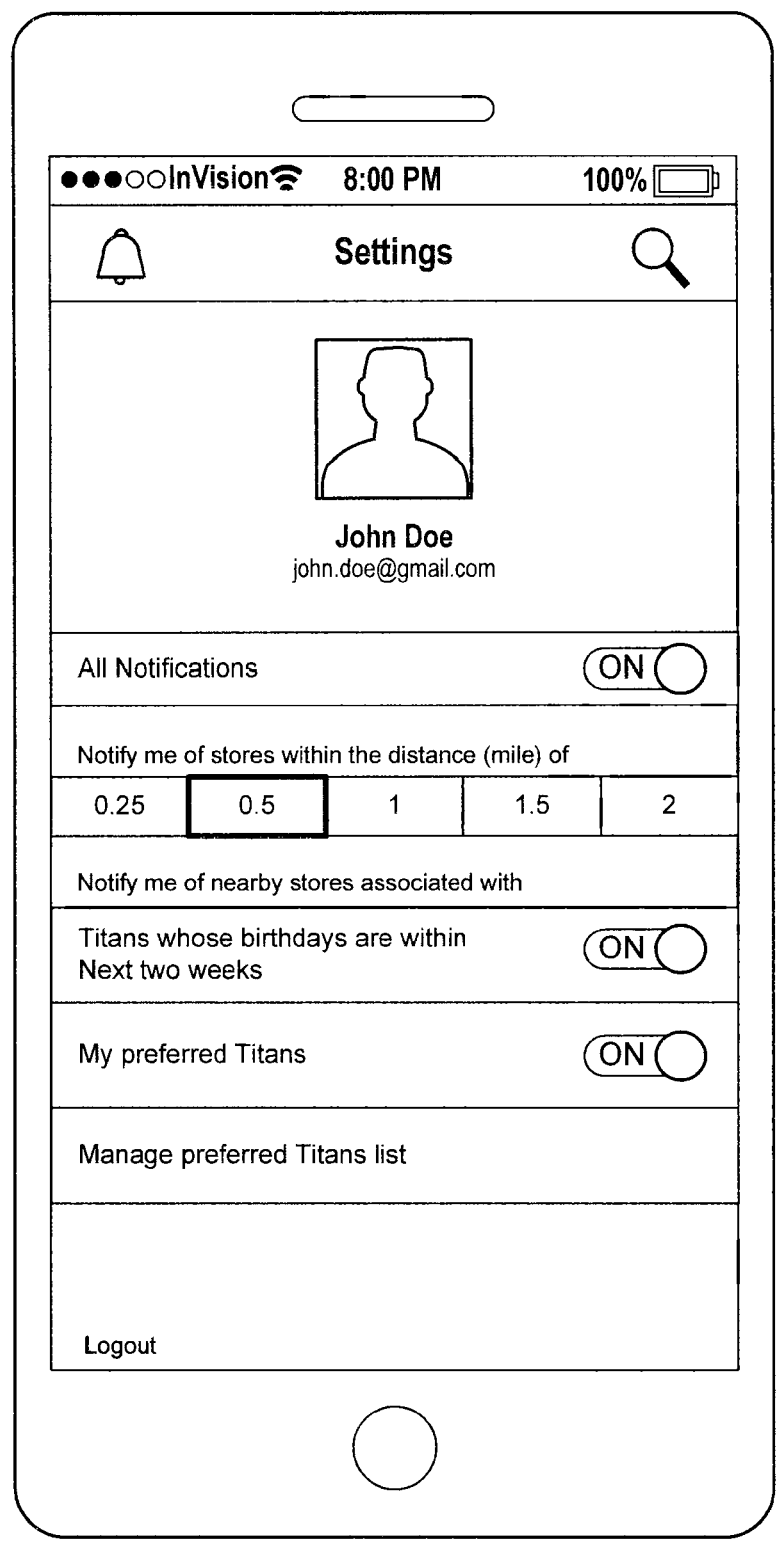
FIG. 10 is a depiction of a mobile application according to aspects of the exemplary embodiment of the present technology's system and method depicted in FIGS. 1 and 2 displaying various parameters for generating alert notifications, which are modifiable according to the user's individual preferences.

FIG. 10 depicts an aspect of a user's profile whereby the user can set certain parameters for when notifications should be sent. As depicted, the user can turn off all notifications, set the proximity threshold between mobile device and merchant, elect to receive notifications only when the member associated with the gift has an upcoming gift-giving event, in this case, a birthday, and elect to receive alerts only for gift items on preferred members' gift lists. In some embodiments of the present technology, additional parameters may also be selected for triggering alerts, such as followed members only, members of groups only, followed gift lists only, chosen merchants only, chosen gift item categories only, items falling under a predetermined budget only, and the like. Those of ordinary skill in the art will appreciate the many additional parameters and arrangements available to the present technology.

While the present technology has been described with reference to particular embodiments and arrangements of parts, features, and the like, the present technology is not limited to these embodiments or arrangements. Indeed, many modifications and variations will be ascertainable to those of skill in the art, all of which are inferentially included in these teachings.

What is claimed is:

1. A system for notifying a user of the user's proximity to a merchant selling a particular gift item, the system comprising:
    a mobile device connected to a network;
    a computing device connected to the network;
    a member database comprising members and at least one list of gift items associated with each member;
    a merchant database comprising merchant locations and inventories;
    location identification software executing on the mobile device that identifies the current location of the mobile device;
    notification software executing on the computing device that generates one or more alerts and sends the one or more alerts to the mobile device;

wherein the mobile device continually relays its current location over the network to the computing device;

wherein the computing device compares the mobile device's location with the merchant locations in the merchant database and determines whether the mobile device is within a threshold proximity of any of the merchant locations;

wherein the computing device compares the merchant inventories in the merchant database with the gift items associated with the members in the member database and determines whether any of the merchants within the threshold proximity of the mobile device sells any of the gift items;

wherein the computing device generates an alert when a merchant selling one or more gift items is within the threshold proximity of the mobile device, the alert comprising information about the merchant and the one or more gift items available for sale, the information including at least the merchant's name and the merchant's current geographical distance from the mobile device; and wherein the computing device sends the alert over the network to the mobile device.

2. The system of claim 1 wherein the user specifies the threshold proximity of the mobile device to the merchant selling the gift item required to trigger the alert.

3. The system of claim 1 wherein the computing device generates an alert when the mobile device enters the boundaries of the merchant selling the gift item.

4. The system of claim 1 wherein:
the member database further comprises gift-giving events associated with each member; and
the user specifies a period of time prior to a gift-giving event, and the computing device generates the alert when the gift item is associated with a member with an associated gift-giving event within the specified time period.

5. The system of claim 1 wherein the user identifies the members the user wishes to follow, the member database stores a flag for those members the user has chosen to follow, and the computing device generates the alert when the gift item is associated with a member the user has chosen to follow.

6. The system of claim 5 wherein the user identifies preferred members the user has chosen to follow, the member database stores a flag for those preferred members, and the computing device generates the alert when the gift item is associated with a preferred member.

7. The system of claim 1 wherein the user identifies one or more groups of members, the group identification is stored in the member database, and the computing device generates the alert when the gift item is associated with a member in one of the groups.

8. The system of claim 1 wherein the user identifies one or more lists of gift items associated with members the user wishes to follow, the member database stores a flag for those lists of gift items the user has chosen to follow, and the computing device generates the alert when the gift item is on one of the lists the user has chosen to follow.

9. The system of claim 1 wherein:
the merchant database further comprises prices for gift items in the merchant inventory; and
the user identifies a maximum budget the user is willing to spend on each member, the maximum budget is stored in the member database, and the computing device generates the alert when the price of the gift item is less than the maximum budget identified for the associated member.

10. The system of claim 1 wherein the user identifies one or more merchants, the merchant database stores a flag for the identified merchants, and the computing device generates the alert when an identified merchant selling one or more gift items is within the threshold proximity of the mobile device.

11. The system of claim 1 wherein the user identifies one or more categories of gift items for each member, the categories are stored in the member database, and the computing device generates the alert when the gift item falls within one of the categories identified for the associated member.

12. A method for notifying a user of the user's proximity to a merchant selling a particular gift item comprising the steps of:
identifying the geolocation of a mobile device connected to a network;
identifying one or more lists of gift items associated with one or more members;
identifying the geolocations of one or more merchants;
identifying the inventory of gift items sold by the one or more merchants;
comparing the geolocation of the mobile device with the geolocations of the one or more merchants;
determining whether the geolocation of the mobile device is within a threshold proximity of the geolocations of any of the merchants;
comparing the inventory of gift items sold by the one or more merchants with the one or more lists of gift items;
determining whether any of the merchants within the threshold proximity of the mobile device sells any of the gift items on any of the lists of gift items associated with the one or more members;
generating an alert notification when a merchant selling one or more gift items is within the threshold proximity of the mobile device, the alert notification comprising information about the merchant and the one or more gift items available for sale, the information including at least the merchant's name and the merchant's current geographical distance from the mobile device; and
sending the alert notification over the network to the mobile device.

13. The method of claim 12 further comprising the step of specifying the threshold proximity of the mobile device to the merchant selling the gift item required to trigger the alert.

14. The method of claim 12 further comprising the step of generating an alert notification when the mobile device enters the boundaries of the merchant selling the gift item.

15. The method of claim 12 further comprising the steps of:
identifying gift-giving events associated with the members;
specifying a period of time prior to a gift-giving event; and
generating the alert notification when there is an upcoming gift-giving event within the specified time period.

16. The method of claim 12 further comprising the steps of:
identifying one or more members the user wishes to follow; and
generating the alert notification when a merchant selling one or more gift items associated with one or more members the user has chosen to follow is within the threshold proximity of the mobile device.

17. The method of claim 16 further comprising the steps of:
   identifying one or more preferred members amongst the members the user has chosen to follow; and
   generating the alert notification when a merchant selling one or more gift items associated with one or more preferred members is within the threshold proximity of the mobile device.

18. The method of claim 12 further comprising the steps of:
   identifying one or more groups of members; and
   generating the alert notification when a merchant selling one or more gift items associated with members in one of the groups is within the threshold proximity of the mobile device.

19. The method of claim 12 further comprising the steps of:
   identifying one or more lists of gift items the user wishes to follow; and
   generating the alert notification when a merchant selling one or more gift items on one of the lists the user has chosen to follow is within the threshold proximity of the mobile device.

20. The method of claim 12 further comprising the steps of:
   identifying prices for the gift items in the inventory sold by the one or more merchants;
   identifying a maximum budget the user is willing to spend on a member; and
   generating the alert notification when a merchant selling one or more gift items with a price below the maximum budget the user identified is within the threshold proximity of the mobile device.

21. The method of claim 12 further comprising the steps of:
   identifying one or more chosen merchants; and
   generating the alert notification when a chosen merchant selling one or more gift items is within the threshold proximity of the mobile device.

22. The method of claim 12 further comprising the steps of:
   identifying one or more categories of gift items; and
   generating the alert notification when a merchant selling one or more gift items falling within one of the categories the user identified is within the threshold proximity of the mobile device.

23. A system for notifying a user of the user's proximity to a merchant selling a particular gift item, the system comprising:
   a mobile device connected to the internet;
   a computing device connected to the internet;
   a member database comprising one or more members and at least one list of gift items associated with each member;
   a merchant database comprising merchant locations and inventories;
   location identification software executing on the mobile device that identifies the current location of the mobile device using GPS technology;
   notification software executing on the computing device that generates one or more alerts and sends the one or more alerts to the mobile device;
   wherein the mobile device continually relays its current location over the internet to the computing device;
   wherein the computing device compares the mobile device's location with the merchant locations in the merchant database and determines whether the mobile device is within a threshold proximity of any of the merchant locations;
   wherein the computing device compares the merchant inventories in the merchant database with the gift items associated with the members in the member database and determines whether any of the merchants within the threshold proximity of the mobile device sells any of the gift items;
   wherein the computing device generates an alert when:
      a merchant selling one or more gift items is within the threshold proximity of the mobile device; and
      at least one additional parameter is satisfied;
      wherein the alert comprises information about the merchant and the one or more gift items available for sale, the information including at least the merchant's name and the merchant's current geographical distance from the mobile device; and
   wherein the computing device sends the alert over the internet to the mobile device.

24. The system of claim 23 wherein the at least one additional parameter comprises any one of the following group:
   a gift-giving event associated with the member associated with the gift item will occur within a threshold time period;
   the user has chosen to follow the member associated with the gift item;
   the user has identified the member associated with the gift item in one or more groups;
   the user has chosen to follow one or more lists containing the gift item;
   the gift item is below a threshold maximum budget;
   the user has identified the merchant selling the gift item as a chosen merchant; and
   the gift item falls within one or more categories of gift items chosen by the user for the associated member.

25. The system of claim 23 wherein the at least one additional parameter comprises any three of the following group:
   a gift-giving event associated with the member associated with the gift item will occur within a threshold time period;
   the user has chosen to follow the member associated with the gift item;
   the user has identified the member associated with the gift item in one or more groups;
   the user has chosen to follow one or more lists containing the gift item;
   the gift item is below a threshold maximum budget;
   the user has identified the merchant selling the gift item as a chosen merchant; and
   the gift item falls within one or more categories of gift items chosen by the user for the associated member.

26. A system for notifying a user of the user's proximity to a merchant selling a particular gift item and other merchants' competing offers for sale, the system comprising:
   a mobile device connected to a network;
   a computing device connected to the network;
   a member database comprising members and at least one list of gift items associated with each member;
   a merchant database comprising merchant location, inventory, and price information;

location identification software executing on the mobile device that identifies the current location of the mobile device;

notification software executing on the computing device that generates one or more alerts and sends the one or more alerts to the mobile device;

wherein the mobile device continually relays its current location over the network to the computing device;

wherein the computing device compares the mobile device's location with the merchant locations in the merchant database and determines whether the mobile device is within a threshold proximity of any of the merchant locations;

wherein the computing device compares the merchant inventories in the merchant database with the gift items associated with the members in the member database and determines whether any of the merchants within the threshold proximity of the mobile device sells any of the gift items;

wherein the computing device generates an alert when a merchant selling one or more gift items is within the threshold proximity of the mobile device;

wherein the alert comprises information about the merchant, including at least the merchant's name and the merchant's current geographical distance from the mobile device information about the one or more gift items, and information about similar gift items sold by one or more other merchants;

wherein the computing device sends the alert over the network to the mobile device; and wherein the user can purchase the one or more gift items over the network from the one or more other merchants.

27. The system of claim 26 wherein:
the information about the one or more gift items comprises at least a description and price information; and
the information about similar gift items sold by one or more other merchants comprises at least a description and price information.

28. The system of claim 26 wherein the computing device generates the alert when at least one additional parameter is met, the at least one additional parameter comprising any one of the following group:
a gift-giving event associated with the member associated with the gift item will occur within a threshold time period;
the user has chosen to follow the member associated with the gift item;
the user has identified the member associated with the gift item in one or more groups;
the user has chosen to follow one or more lists containing the gift item;
the gift item is below a threshold maximum budget;
the user has identified the merchant selling the gift item as a chosen merchant; and
the gift item falls within one or more categories of gift items chosen by the user for the associated member.

29. The system of claim 26 wherein the computing device generates the alert when at least three additional parameters are met, the at least three additional parameters comprising any three of the following group:
a gift-giving event associated with the member associated with the gift item will occur within a threshold time period;
the user has chosen to follow the member associated with the gift item;
the user has identified the member associated with the gift item in one or more groups;
the user has chosen to follow one or more lists containing the gift item;
the gift item is below a threshold maximum budget;
the user has identified the merchant selling the gift item as a chosen merchant; and
the gift item falls within one or more categories of gift items chosen by the user for the associated member.

30. The system of claim 26 wherein the computing device generates the alert when each of the following additional parameters are met:
a gift-giving event associated with the member associated with the gift item will occur within a threshold time period;
the user has chosen to follow the member associated with the gift item;
the user has identified the member associated with the gift item in one or more groups;
the user has chosen to follow one or more lists containing the gift item;
the gift item is below a threshold maximum budget;
the user has identified the merchant selling the gift item as a chosen merchant; and
the gift item falls within one or more categories of gift items chosen by the user for the associated member.

* * * * *